US008693549B2

(12) United States Patent
Choi et al.

(10) Patent No.: US 8,693,549 B2
(45) Date of Patent: Apr. 8, 2014

(54) METHOD AND APPARATUS FOR SELECTIVE INTER-LAYER PREDICTION ON MACROBLOCK BASIS

(75) Inventors: Hae-Chul Choi, Daejeon (KR); Jae-Gon Kim, Daejeon (KR); Jin-Woo Hong, Daejeon (KR); Sung-Jea Ko, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1181 days.

(21) Appl. No.: 12/097,808

(22) PCT Filed: Jan. 16, 2007

(86) PCT No.: PCT/KR2007/000265
§ 371 (c)(1),
(2), (4) Date: Jun. 17, 2008

(87) PCT Pub. No.: WO2007/081189
PCT Pub. Date: Jul. 19, 2007

(65) Prior Publication Data
US 2009/0252220 A1    Oct. 8, 2009

(30) Foreign Application Priority Data

Jan. 16, 2006  (KR) .................. 10-2006-0004483
Jan. 16, 2007  (KR) .................. 10-2007-0004669

(51) Int. Cl.
*H04N 7/26*        (2006.01)
(52) U.S. Cl.
USPC ............ 375/240.24; 375/240.02; 375/240.12; 375/240.16; 382/236

(58) Field of Classification Search
USPC ............. 375/240.02, 240.12, 240.16, 240.24; 382/236
See application file for complete search history.

(56) References Cited

U.S. PATENT DOCUMENTS

| | | | |
|---|---|---|---|
| 2002/0015513 A1 | 2/2002 | Ando et al. | |
| 2003/0118239 A1 | 6/2003 | Suh et al. | |
| 2005/0190976 A1 | 9/2005 | Todoroki et al. | |
| 2006/0233263 A1* | 10/2006 | Park et al. | 375/240.25 |
| 2007/0014346 A1* | 1/2007 | Wang et al. | 375/240.1 |
| 2008/0089411 A1* | 4/2008 | Wenger et al. | 375/240.12 |
| 2009/0180537 A1* | 7/2009 | Park et al. | 375/240.13 |

FOREIGN PATENT DOCUMENTS

| | | |
|---|---|---|
| KR | 1020000031031 A | 6/2000 |
| KR | 1020050112588 A | 12/2005 |

OTHER PUBLICATIONS

International Search Report mailed Apr. 11, 2007; PCT/KR2007/000265.

* cited by examiner

*Primary Examiner* — Un C Cho
*Assistant Examiner* — Siming Liu
(74) *Attorney, Agent, or Firm* — Ladas & Parry LLP

(57) ABSTRACT

Provided are an enhanced inter-layer reference picture designating method and apparatus and an enhanced inter-layer reference picture recovering method and apparatus capable of increasing coding efficiency by allowing different blocks in an upper spatial layer picture of a current to-be-decoded or to-be-encoded picture to refer to blocks in different lower spatial layer pictures.

17 Claims, 13 Drawing Sheets

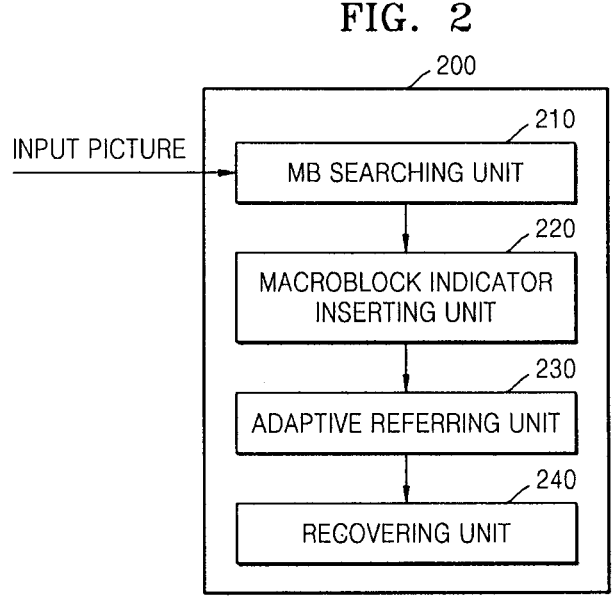
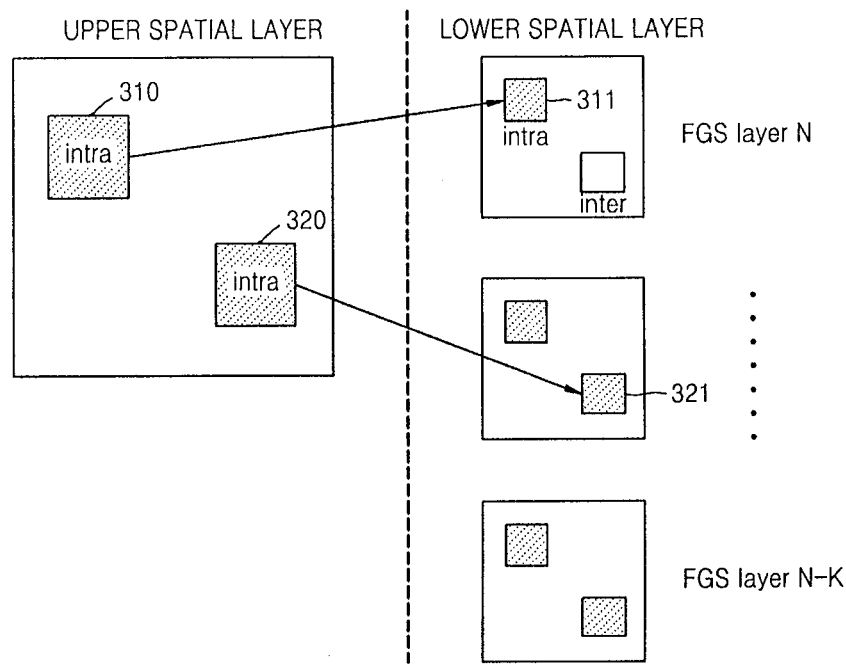

FIG. 10A

Slice header in scalable extension

| slice_header_in_scalable_extension( ) { | C | Descriptor |
|---|---|---|
| ... | | |
| ~~base_id_plus1~~ | 2 | ue(v) |
| if( base_id_plus1 != 0 ) { | | |
| adaptive_prediction_flag | 2 | u(1) |
| } | | |
| ... | | |
| } | | |

FIG. 10B

Macroblock layer in scalable extension syntax

| macroblock_layer_in_scalable_extension( ) { | C | Descriptor |
|---|---|---|
| if( in_crop_window( CurrMbAddr ) ) | | |
| if(adaptive_prediction_flag ) { | | |
| mb_base_id_plus1 | 1 | ue(v) |
| base_mode_flag | 2 | u(1) \| ae(v) |
| if( ! base_mode_flag && SpatialScalabilityType > 0 && ! intra_base_mb( CurrMbAddr ) ) | | |
| base_mode_refinement_flag | 2 | u(1) \| ae(v) |
| } | | |
| } | | |
| ... | | |
| } | | |

FIG. 13

Macroblock layer in scalable extension syntax

| macroblock_layer_in_scalable_extension( ) { | C | Descriptor |
|---|---|---|
| if( in_crop_window( CurrMbAddr ) ) | | |
| if(adaptive_prediction_flag ) { | | |
| base_mode_flag | 2 | u(1) \| ae(v) |
| if( ! base_mode_flag  &&  SpatialScalabilityType > 0    &&<br>! intra_base_mb( CurrMbAddr ) ) | | |
| base_mode_refinement_flag | 2 | u(1) \| ae(v) |
| } | | |
| } | | |
| ... | | |
| multi_reference_flag | 2 | u(1) |
| if( multi_reference_flag) | | |
| mb_base_id_plus1 | 2 | ue(v) |
| } | | |

METHOD AND APPARATUS FOR SELECTIVE INTER-LAYER PREDICTION ON MACROBLOCK BASIS

TECHNICAL FIELD

The present invention relate to an enhanced inter-layer reference picture designating method and apparatus, and more particularly, to an enhanced inter-layer reference picture designating method and apparatus capable of implementing enhanced inter-layer prediction by allowing blocks in a current input picture to refer to macroblocks in different lower spatial layer pictures of the current input picture in scalable video coding.

BACKGROUND ART

A procedure of a current picture referring to a low layer picture in scaleable video coding (SVC) is called inter-layer prediction. Among the inter-layer prediction procedures, a procedure of referring to texture information of a lower spatial layer picture is called inter-layer texture prediction.

The inter-layer texture prediction in the SCV includes two modes, that is, a constrained inter-layer texture prediction mode and a single-loop-decoding constrained inter-layer texture prediction mode.

In the single-loop-decoding constrained inter-layer texture prediction mode for SVC, the macroblocks in the current to-be-encoded input picture can refers to only intrablocks in lower spatial layer pictures indicated by indicators inserted into a slice header of the current input picture.

In other words, in the single-loop-decoding constrained inter-layer texture prediction mode, only one lower spatial layer picture indicated by the slice indicator can be referred by all the macroblocks in the current input picture, but lower spatial layer pictures that are lower than the lower spatial layer picture indicated by the slice indicator cannot be referred.

DETAILED DESCRIPTION OF THE INVENTION

Technical Problem

The present invention provides enhanced inter-layer reference picture designating apparatus and method and enhanced inter-layer reference picture decoder and decoding method capable of implementing enhanced inter-layer texture prediction by allowing blocks in a current input picture to refer to macroblocks in different lower spatial layer pictures of the current input picture in scalable video coding.

Technical Solution

According to an aspect of the present invention, there is provided an enhanced inter-layer reference picture designating apparatus comprising: a macroblock searching unit which hierarchically retrieves at least one of lower spatial layer pictures of an input picture to search for macroblocks in the at least one of the lower spatial layer pictures corresponding to macroblocks in the input picture; a macroblock indicator inserting unit which inserts macroblock indicators indicating the lower spatial layer pictures including the searched macroblocks into the macroblocks in the input picture corresponding to the searched macroblocks; and an adaptive referring unit which refers to the macroblocks in the at least one of the lower spatial layer pictures indicated by the macroblock indicators.

According to another aspect of the present invention, there is provided an enhanced inter-layer reference picture designating apparatus comprising: a macroblock indicator setting unit which sets macroblock indicators indicating macroblocks in at least one of lower spatial layer pictures corresponding to macroblocks in an input picture; a determination indicator inserting unit which inserts a determination indicator into a macroblock header, the determination indicator indicating equality between a lower spatial layer including the macroblock indicated by the macroblock indicator and a lower spatial layer indicated by a slice indicator of the input picture; and a selective macroblock indicator inserting unit which inserts the macroblock indicator into the macroblock header if the lower spatial layer indicated by the slice indicator is different from the lower spatial layer indicated by the macroblock indicator.

The enhanced inter-layer reference picture designating apparatus may further comprise an adaptive referring unit which refers to the lower spatial layer indicated by the slice indicator if the determination indicator indicates equality and to the at least one of the lower spatial layers indicated by the macroblock indicators if the determination indicator indicates unequality.

According to another aspect of the present invention, there is provided an enhanced inter-layer reference picture designating apparatus comprising: a determination unit which determines whether or not there are macroblocks in lower spatial layer pictures indicated by a slice indicator of an input picture corresponding to macroblocks in the input picture; and an automatic intrablock referring unit which refers to lower spatial layers indicated by the slice indicator if there are the corresponding macroblocks and hierarchically retrieves the lower spatial layer pictures to refer to the lower spatial layers in where the corresponding macroblocks exist if there are no corresponding macroblocks.

According to another aspect of the present invention, there is provided an enhanced inter-layer reference picture decoder comprising: a receiving unit which receives a bitstream including macroblock indicators indicating lower spatial layers including macroblocks corresponding to macroblocks in an input picture; an adaptive referring unit which refers to the macroblocks in at least one of the lower spatial layer pictures indicated by the macroblock indicators; and a recovering unit which recovers blocks by performing inter-layer texture prediction decoding based on the macroblocks in the at least one of the lower spatial layer pictures.

According to another aspect of the present invention, there is provided an enhanced inter-layer reference picture decoder comprising: a receiving unit which receives a bitstream including a slice indicator which indicates a lower spatial layer picture slice to which macroblocks in an input picture slice refers most times, macroblock indicators which indicate lower spatial layer pictures including macroblocks corresponding to the macroblocks in the input picture, and a determination indicator indicating equality between a lower spatial layer including the macroblock indicated by the macroblock indicator and a lower spatial layer indicated by a slice indicator of the input picture; and an adaptive referring unit which refers to the lower spatial layer indicated by the slice indicator or at least one of the lower spatial layers indicated by the macroblock indicators based on the determination indicator; and a recovering unit which recovers blocks by performing inter-layer texture prediction decoding based on the at least one of the lower spatial layer pictures to which the adaptive referring unit refers.

According to another aspect of the present invention, there is provided an enhanced inter-layer reference picture designating method comprising: hierarchically retrieving at least one of lower spatial layer pictures of an input picture and searching for macroblocks in the lower spatial layer pictures corresponding to macroblocks in the input picture; inserting macroblock indicators indicating the lower spatial layer pictures including the searched macroblocks into the macroblocks in the input picture corresponding to the searched macroblocks; and referring to the macroblocks in the at least one of the lower spatial layer pictures indicated by the macroblock indicators.

According to another aspect of the present invention, there is provided an enhanced inter-layer reference picture designating method comprising: setting macroblock indicators indicating macroblocks in at least one of lower spatial layer pictures corresponding to macroblocks in an input picture; inserting into a macroblock header a determination indicator indicating equality between a lower spatial layer including the macroblock indicated by the macroblock indicator and a lower spatial layer indicated by a slice indicator of the input picture; and inserting the macroblock indicator into the macroblock header if the lower spatial layer indicated by the slice indicator is different from the lower spatial layer indicated by the macroblock indicator.

According to another aspect of the present invention, there is provided an enhanced inter-layer reference picture designating method comprising: determining whether or not there are macroblocks in lower spatial layer pictures indicated by a slice indicator of an input picture corresponding to macroblocks in the input picture; and referring to lower spatial layers indicated by the slice indicator if there are the corresponding macroblocks and hierarchically retrieving the lower spatial layer pictures to refer to the lower spatial layers in where the corresponding macroblocks exist if there are no corresponding macroblocks.

According to another aspect of the present invention, there is provided an enhanced inter-layer reference picture decoding method comprising: receiving a bitstream including macroblock indicators indicating lower spatial layers including macroblocks corresponding to macroblocks in an input picture; adaptively referring to the macroblocks in at least one of the lower spatial layer pictures indicated by the macroblock indicators; and recovering blocks by performing inter-layer texture prediction decoding based on the macroblocks in at least one of the lower spatial layer pictures.

According to another aspect of the present invention, there is provided an enhanced inter-layer reference picture decoding method comprising: receiving a bitstream including a slice indicator which indicates a lower spatial layer picture slice to which macroblocks in an input picture slice refers most times, macroblock indicators which indicate lower spatial layer pictures including macroblocks corresponding to the macroblocks in the input picture, and a determination indicator indicating equality between a lower spatial layer including the macroblock indicated by the macroblock indicator and a lower spatial layer indicated by a slice indicator of the input picture; and referring to the lower spatial layer indicated by the slice indicator or at least one of the lower spatial layers indicated by the macroblock indicators based on the determination indicator; and recovering blocks by performing inter-layer texture prediction decoding based on at least one of the lower spatial layer pictures referred in the referring.

According to another aspect of the present invention, there is provided an enhanced inter-layer reference picture decoding method comprising: receiving a bitstream including a slice indicator indicating a lower spatial layer picture slice for inter-layer prediction of an input picture slice; determining whether or not there is an intrablock corresponding to a current to-be-encoded intrablock in the lower spatial layer picture slice indicated by the slice indicator of the input picture including the current to-be-encoded intrablock; hierarchically retrieving lower spatial layer pictures to search for the lower spatial layer picture including the corresponding intrablock if there is no corresponding intrablock; and adaptively referring to the lower spatial layer picture indicated by the slice indicator or the searched lower spatial layer picture.

Advantageous Effects

Accordingly, it is possible to increase coding efficiency by allowing different blocks in an upper spatial layer picture of a current to-be-decoded or to-be-encoded picture to refer to blocks in different lower spatial layer pictures.

DESCRIPTION OF THE DRAWINGS

FIG. 2 illustrates an example of an operation of inserting inter-layer reference picture indicator into each macroblock in an enhanced inter-layer reference picture designating method according to an embodiment of the present invention.

FIG. 3 illustrates inter-layer reference performed in the inter-layer reference picture designating apparatus of FIG. 2.

FIGS. 10A and 10B illustrate examples of a slice header and a macroblock syntax used for scalable extension in an enhanced inter-layer reference picture decoder according to another embodiment of the present invention.

FIG. 13 illustrates a macroblock syntax used for scalable extension of FIG. 12 according to another embodiment of the present invention.

BEST MODE

Figure 1:
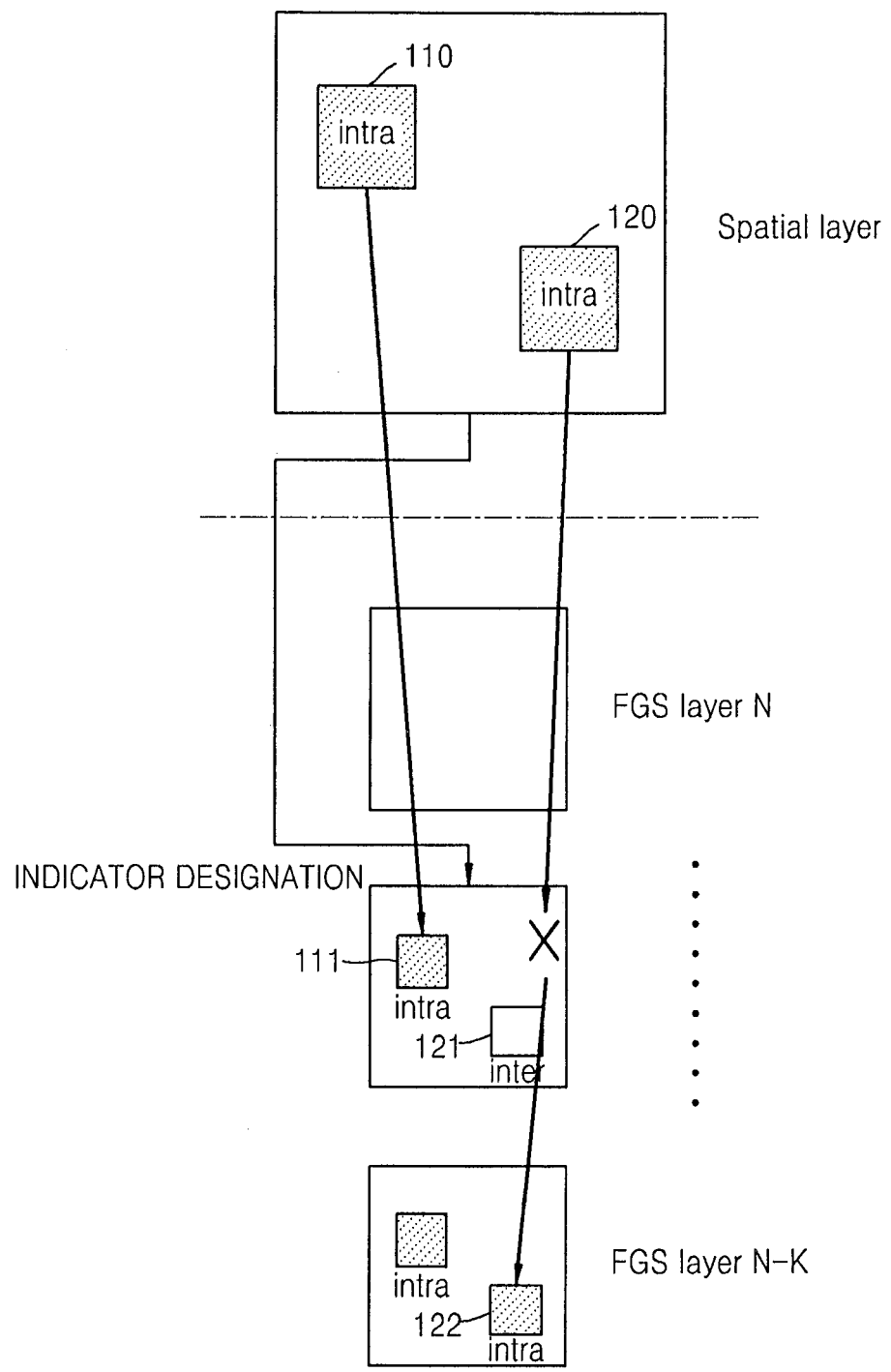
FIG. 1 illustrates a conventional single-loop-decoding inter-layer texture prediction.

Hereinafter, exemplary embodiments of the present invention are described in detail with reference to the accompanying drawings. Like reference numerals in the drawings denote like elements. For the clarifying of the present invention, description of well-know functions and components may be omitted.

In order to provide spatial scalability in scalable video coding (SVC), encoding is performed in each layer according to resolution of each video, and in order to remove redundant information between layers, inter-layer prediction is performed.

When motion information of a fine granularity scalable (FGS) layer of a lower spatial layer picture is used for an upper spatial layer picture, one or more motion mode corresponding to each macroblock or subblock may exist in each layer representing one spatial resolution. Therefore, motion mode used for higher layer picture prediction may also exist in the lower spatial layer picture. Accordingly, in the inter-layer prediction, if redundancy between layers is efficiently removed, it is possible to increase coding efficiency.

Among the inter-layer predictions, a process of referring to texture information of a lower spatial layer picture is called inter-layer texture prediction. The inter-layer texture prediction includes a constrained inter-layer texture prediction mode and a single-loop-decoding constrained inter-layer texture prediction mode.

Macroblocks in a current to-be-encoded picture are arranged to refer to the corresponding macroblocks in lower spatial layer pictures indicated by indicators in a slice header of the current picture.

In case of single-loop decoding, the inter-layer texture prediction can be performed only if the corresponding macroblocks in the lower spatial layer picture are intrablocks. On the other hand, in case of multi-loop decoding, sine all the macroblocks in the lower spatial layer pictures indicated by the indicators are re-constructed, the inter-layer texture prediction can be performed on all the macro blocks.

According to the present invention, it is possible to provide an enhanced inter-layer texture prediction method in the single-loop-decoding inter-layer texture prediction by referring to the intrablocks of the lower spatial layer pictures in the single-loop decoding scheme for both of the constrained inter-layer texture prediction mode and the multi-loop-decoding constrained inter-layer texture prediction mode to predict the current to-be-encoded intrablocks.

According to an embodiment of the present invention, there is provided an enhanced inter-layer reference picture designating apparatus for the enhanced inter-layer texture prediction.

FIG. 1 illustrates a conventional single-loop-decoding inter-layer texture prediction.

As shown in FIG. 1, intrablocks 110 and 120 can be predicted and recovered by referring to only intrablocks in lower spatial layer pictures indicated by indicators. If the macroblock in the lower spatial layer picture indicated by the indicator is an inter-block 121, the inter-layer texture reference of the intrablock 120 cannot be performed, so that the intrablock 120 cannot refer to an intra block 122 in a lower spatial layer picture which is lower than the lower spatial layer picture indicated by the indicator and corresponds to the current block.

In FIG. 1, the lower spatial layer indicated by the indicator of the current to-be-encoded (or to-be-decoded) picture may be lower spatial layers or FGS layers of the lower spatial layers.

The present invention provides enhanced methods of the conventional inter-layer reference methods. FIGS. 2, 3, 10A, and 10B, and FIG. 11 illustrate enhanced inter-layer texture prediction methods using an operation of inserting inter-layer reference picture indicators into macroblocks.

Figure 7:
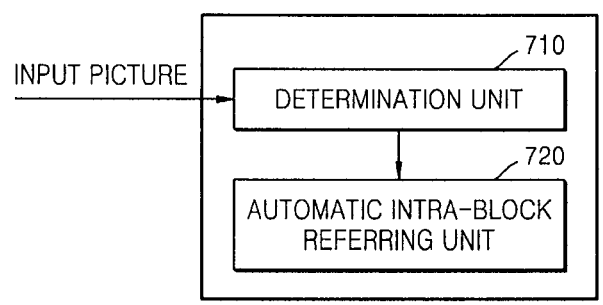
FIG. 7 illustrates an enhanced inter-layer reference picture automatic designating apparatus according to another embodiment of the present invention.
Figure 8:
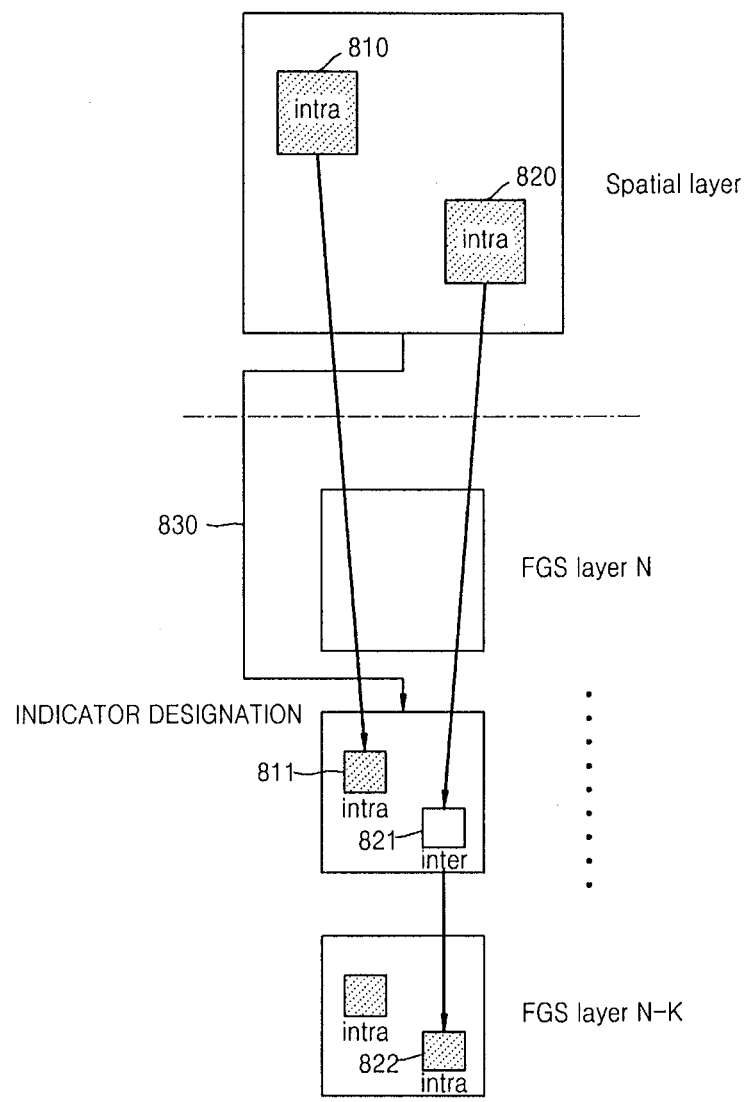
FIG. 8 illustrates inter-layer reference in the enhanced inter-layer reference picture automatic designating apparatus of FIG. 7.
Figure 14:
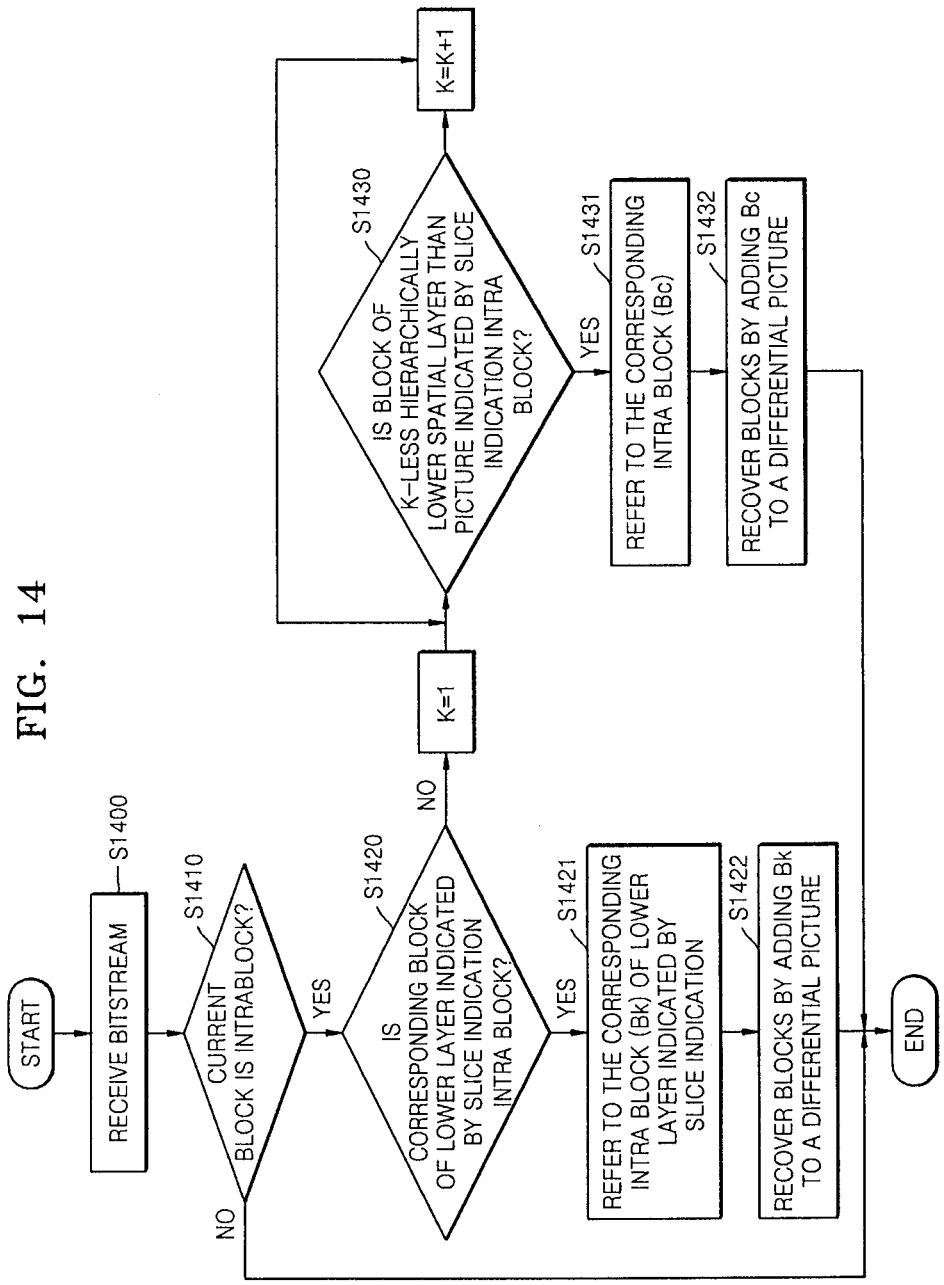
FIG. 14 illustrates a flowchart of an enhanced inter-layer reference picture decoding method using an operation of automatically searching an inter-layer reference picture according to another embodiment of the present invention.

FIGS. 4 to 6, 12, 13 illustrate enhanced inter-layer texture prediction methods using an operation of determining equality between a picture indicated by a current picture slice header and a picture indicated by an indicator inserted into a macroblock. FIGS. 7, 8, 14 illustrate enhanced inter-layer reference prediction methods using an operation of automatically searching for inter-layer reference picture.

FIG. 2 illustrates an example of the operation of inserting the inter-layer reference picture indicators into macroblocks in an enhanced inter-layer reference picture designating method according to an embodiment of the present invention.

In order to insert the inter-layer reference picture indicators into the macroblocks, indicators which are inserted into the slice header used for current SVC and indicate reference pictures for single-loop-decoding inter-layer texture prediction are removed (see FIG. 10A). As an example of the indicators, there is "base_id_plus1" which is included in a slice header syntax used for scalable extension in Working Draft 6.

Next, each of macroblock indicators are inserted into the each of macroblocks of the current input picture (see FIG. 10B), wherein the macroblock indicators indicate macroblocks of lower spatial layer pictures on which the single-loop-decoding inter-layer texture prediction is performed.

As an example of the embodiment, an enhanced inter-layer reference picture designating apparatus 200 includes a macroblock searching unit 210, a macroblock indicator inserting unit 220, an adaptive referring unit 230, and a recovering unit 240.

The macroblock searching unit 210 hierarchically retrieves at least one of lower spatial layer pictures of an input picture to search for macroblocks in the lower spatial layer pictures corresponding to macroblocks in the input picture. In the present invention, a spatiality or a quality of the lower spatial layer pictures is less than that of the input picture. In other words, in the present invention, it is assumed that the input picture is not a picture of the base layer in terms of spatiality or quality of picture.

The macroblock indicator inserting unit 220 inserts into macroblock headers macroblock indicators indicating the lower spatial layer pictures including the macroblocks searched by the macroblock searching unit 210. In other words, the macroblock indicators indicating the lower spatial layer pictures including the macroblocks corresponding to the macroblocks in the current input picture are inserted into the macroblock headers of the macroblocks in the current input picture (see mb_base_id_plus1 in FIG. 10B).

The adaptive referring unit 230 refers to the macroblocks in at least one of the lower spatial layer pictures indicated by the macroblocks indicators inserted into the macroblocks in the input picture. The macroblock indicators may indicate the highest layer picture among the lower spatial layer pictures including the macroblocks corresponding to the macroblocks in the input picture.

The recovering unit 240 performs recovering by using inter-layer texture prediction based on the macroblocks in at least one of the lower spatial layer pictures referred by the adaptive referring unit 230.

FIG. 3 illustrates inter-layer reference performed in the inter-layer reference picture designating apparatus of FIG. 2.

The macroblock searching unit 210 searches for an intrablock 311 corresponding to an intrablock 310 from an FGS layer N and an intrablock 321 corresponding to an intrablock 320 form another FGS layer.

Next, the macroblock indicator inserting unit 220 inserts a macroblock indicator, for example, mb_base_id_plus1 shown in FIG. 10B, into the macroblock header. The adaptive referring unit 230 refers to the lower spatial layer picture corresponding to the intrablock 311 and the other lower spatial layer picture corresponding to the intrablock 321.

Figure 4:
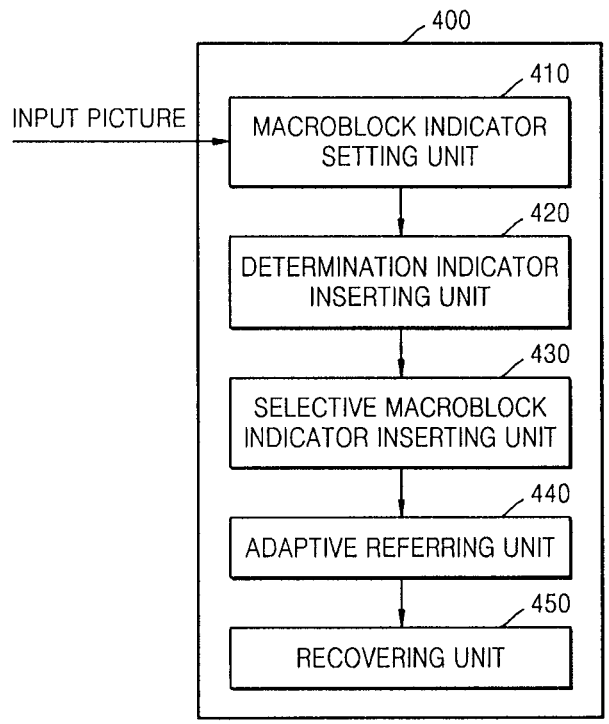
FIG. 4 illustrates a flowchart of performing inter-layer texture prediction by determining equality between a picture indicated by a current picture slice header and a picture indicated by a indicator inserted into a macroblock according to another embodiment.

FIG. 4 illustrates a flowchart of performing inter-layer texture prediction by determining equality between a picture indicated by a current picture slice header and a picture indicated by a indicator inserted into a macroblock according to another embodiment.

Unlike the method shown in FIG. 2 where the indicators in the slice header are removed, a slice header (for example, base_id_plus1) included in a slice header syntax is used as an indicator indicating a lower spatial layer pictures to which the macroblocks in the input picture refers most times.

Next, a determination indicator indicating equality between the lower spatial layer picture referred by each macroblock in the input picture and the lower spatial layer picture indicated by the slice indicator is additionally inserted into each of the macroblock headers.

If the determination indicator indicates unequality, the macroblock indicator indicating the lower spatial layer picture referred by the macroblock is inserted into the macroblock header.

According to the embodiment of the present invention, an enhanced inter-layer reference picture designating apparatus 400 includes a macroblock indicator setting unit 410, a determination indicator inserting unit 420, a selective macroblock indicator inserting unit 430, an adaptive referring unit 440, and a recovering unit 450.

The macroblock indicator setting unit 410 sets macroblock indicators indicating at least one of the lower spatial layer pictures including the macroblocks corresponding to the macroblocks in the input picture.

The macroblock indicator may indicate the highest layer picture among the lower spatial layer pictures including the macroblocks corresponding to the macroblocks in the input picture.

The determination indicator inserting unit 420 inserts into a macroblock header a determination indicator indicating equality between the lower spatial layer picture including the macroblock indicated by the macroblock indicator set by the macroblock indicator setting unit 410 and the lower spatial layer picture indicated by the slice indicator in the input picture.

In this case, the slice indicator is an indicator indicating the lower spatial layer picture to which the macroblocks in the input picture refers most times. In addition, the slice indicator indicates a slice of reference lower spatial layer picture which is inserted into the slice header of the input picture for inter-layer prediction.

If the lower spatial layer pictures indicated by the slice indicator are not equal to the lower spatial layer picture indicated by the macroblock indicator, the selective macroblock indicator inserting unit 430 inserts the macroblock indicator into the macroblock header.

Next, if the determination indicator indicates equality, the adaptive referring unit 440 refers to the lower spatial layer picture indicated by the slice indicator. If the determination indicator indicates unequality, the adaptive referring unit 440 refers to at least one of the lower spatial layer pictures indicated by the macroblock indicators. An example thereof is described below in detail with reference to FIG. 5.

The recovering unit 450 performs recovering by using inter-layer texture prediction based on the macroblocks in at least one of the lower spatial layer pictures referred by the adaptive referring unit 440.

Figure 5:
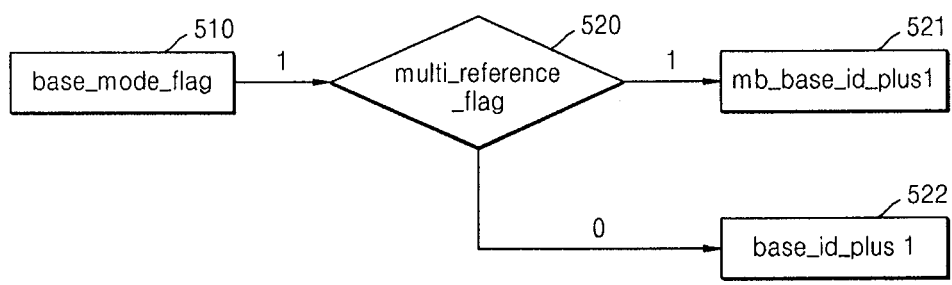
FIG. 5 illustrates an example of the determination indicator used for the enhanced inter-layer reference picture designating apparatus of FIG. 4.

FIG. 5 illustrates an example of the determination indicator used for the enhanced inter-layer reference picture designating apparatus of FIG. 4.

In FIG. 5, the slice indicator, the determination indicator, and the selective macroblock indicator are denoted by base_mode_flag, multi_reference_flag, and mb_base_id_plus1, respectively.

If the lower spatial layer picture indicated by the slice indicator base_mode_flag 510 is equal to the lower spatial layer picture indicated by the selective macroblock indicator mb_base_id_plus1, the determination indicator multi_reference_flag is set to "1", the selective macroblock indicator indicating the picture referred by the macroblock is inserted to the macroblock header, and the picture indicated by the macroblock indicator mb_base_id_plus1 is referred.

if the lower spatial layer picture indicated by the slice indicator base_mode_flag 510 is not equal to the lower spatial layer picture indicated by the selective macroblock indicator mb_base_id_plus1, the determination indicator multi_reference_flag is set to "0", and the picture indicated by the macroblock indicator base_id_plus1 is referred.

Figure 6A:
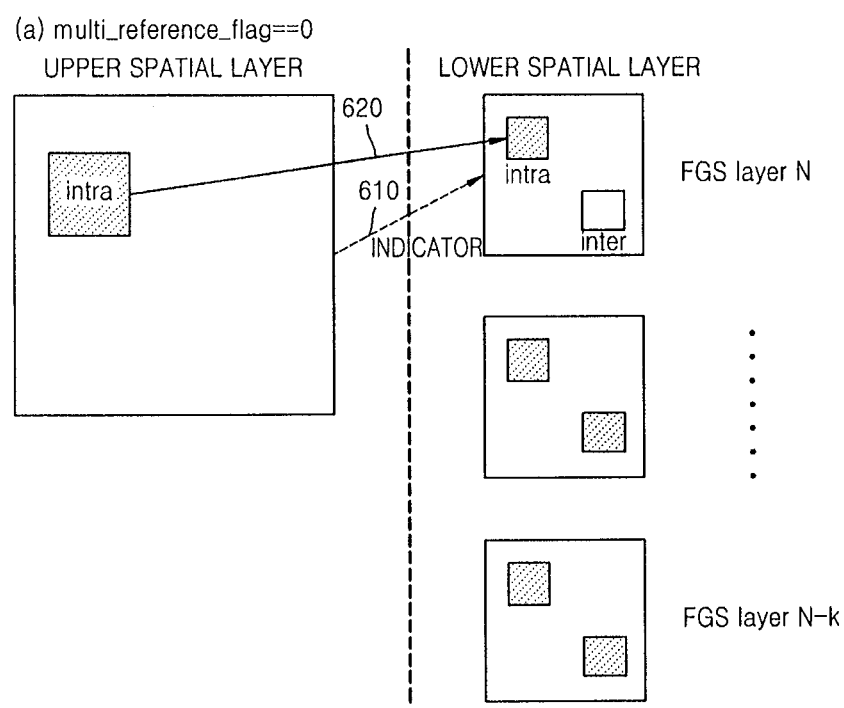
FIGS. 6A and 6B illustrate inter-layer reference in the enhanced inter-layer reference picture designating apparatus of FIG. 4.
Figure 6B:
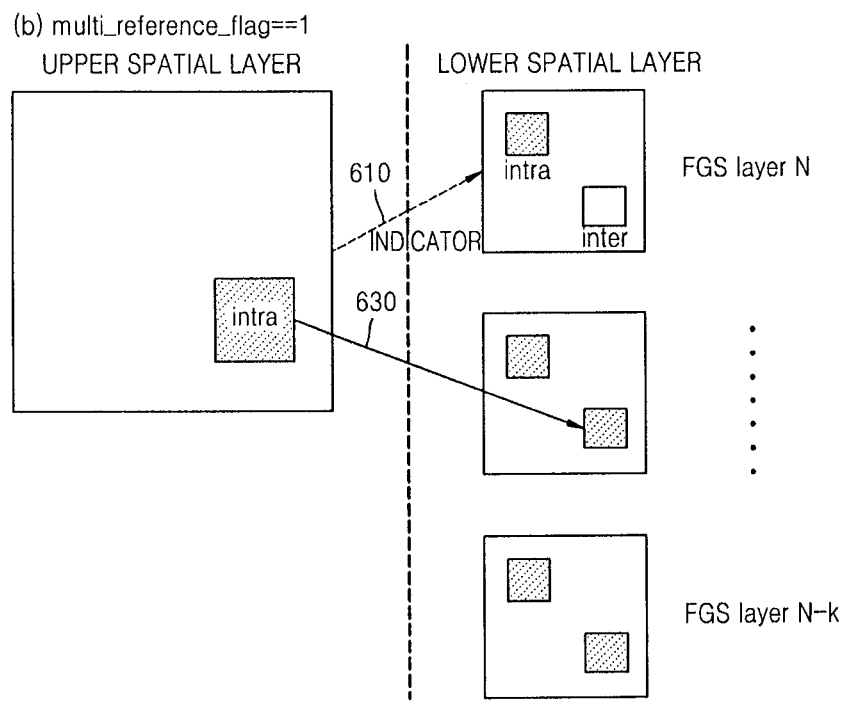

FIGS. 6A and 6B illustrate inter-layer reference in the enhanced inter-layer reference picture designating apparatus of FIG. 4;

FIG. 6A illustrates the inter-layer reference in case of the determination indicator multi_reference_flag set to "0", in which the lower spatial layer picture indicated by the slice indicator is equal to the lower spatial layer picture indicted by an intrablock.

FIG. 6B illustrates the inter-layer reference in case of the determination indicator multi_reference_flag set to "1", in which the lower spatial layer picture indicated by the slice indicator is not equal to the lower spatial layer picture indicted by an intrablock.

FIG. 7 illustrates an enhanced inter-layer reference picture automatic designating apparatus according to another embodiment of the present invention.

The enhanced inter-layer reference picture automatic designating apparatus includes a determination unit 710 and an automatic intrablock referring unit 720.

The determination unit 710 determines whether or not intrablocks corresponding to the intrablocks in the input picture exist in the lower spatial layer pictures indicated by the slice indicators in the input picture.

If the intrablocks are determined to exist by the determination unit 710, the automatic intrablock referring unit 720 refers to the lower spatial layer indicated by the slice indicators. If the intrablocks are determined not to exist by the determination unit 710, the intrablocks in the input picture hierarchically retrieves the lower spatial layer pictures and refer to the lower spatial layer picture where the corresponding intrablock exist.

The automatic intrablock referring unit 720 may refer to the highest layer picture among at least one of the lower spatial layer pictures including the macroblocks corresponding to the macroblocks in the input picture.

FIG. 8 illustrates inter-layer reference in the enhanced inter-layer reference picture automatic designating apparatus of FIG. 7.

If the macroblock in the lower spatial layer picture corresponding to the intrablock 810 in the input picture is an intrablock, the inter-layer texture prediction is performed by referring to the lower spatial layer picture indicated by the slice indicator.

On the other hand, like the intrablock 820 shown in FIG. 8, if an intrablock corresponding to the intrablock 820 does not exist in the lower spatial layer picture indicated by the slice indicator, the searching is performed as follows. For example, if the lower spatial layer indicated by the slice indicator is the (N−1)-th FGS layer, the (N−2)-th FGS layer is searched. If the macroblock corresponding to the (N−2)-th FGS layer is an inter-block, the (N−3)-th FGS layer is searched. If the macroblock corresponding to the (N−3)-th FGS layer is an intrablock, the inter-layer texture prediction is performed based on information on the (N−3)-th FGS layer.

Figure 9:
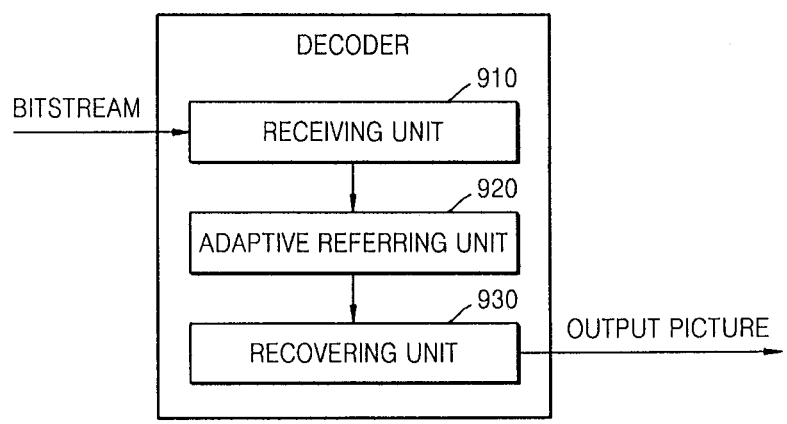
FIG. 9 illustrates an enhanced inter-layer reference picture decoder according to another embodiment of the present invention.

FIG. 9 illustrates an enhanced inter-layer reference picture decoder according to another embodiment of the present invention.

As a basic construction for implementing the inter-layer reference picture decoding method according to an embodiment of the present invention, the enhanced inter-layer reference picture decoder includes a receiving unit 910 which receives a bitstream, an adaptive referring unit 920 which refers to at least one of lower spatial layer pictures based on informed extracted from the bitstream, and a recovering unit 930 which recover blocks by performing inter-layer reference picture decoding based on the referred picture.

FIGS. 10A and 10B illustrate examples of a slice header and a macroblock syntax used for scalable extension in an enhanced inter-layer reference picture decoder according to another embodiment of the present invention.

FIG. 10A illustrates a modification of a conventional slice header syntax in a case where the inter-layer reference picture indicators are inserted into macroblocks as described with reference to FIGS. 2 and 3.

AS shown in FIG. 10A, in order to insert the inter-layer reference picture indicators into the macroblocks, indicators which are inserted into the slice header used for current SVC and indicate reference pictures for single-loop-decoding inter-layer texture prediction are removed. As an example of the indicators, there is "base_id_plus1" which is included in a slice header syntax used for scalable extension in Working Draft 6.

Next, as shown in FIG. 10B, the indicator mb_base_id_plus1 is inserted into the macroblock header.

FIG. 10A illustrates a case where the inter-layer reference picture indicators are inserted into the macroblocks according to the embodiment of the present invention. It should be noted that the syntax shown in FIG. 10A is not used for a case where the lower spatial layer is referred based on a result of determination of equality between a picture indicated by an indicator inserted into the slice header and a picture indicated by an indicator inserted into the macroblock header.

Figure 11:
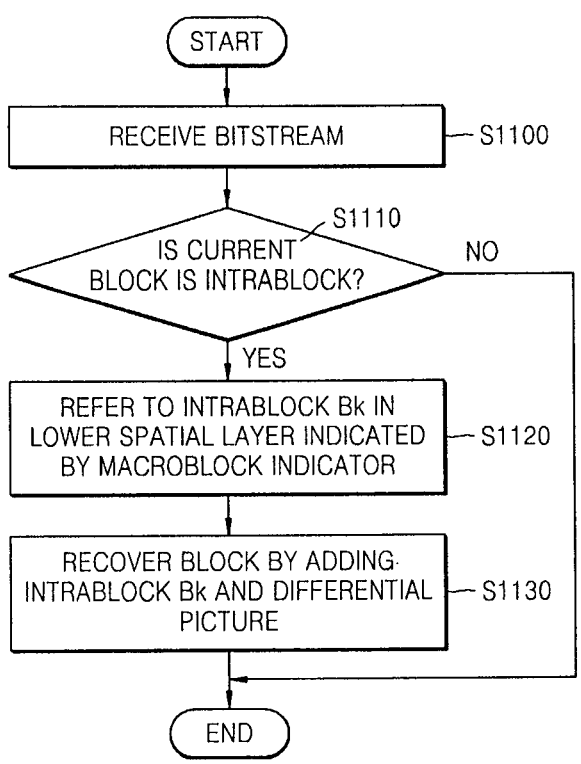
FIG. 11 illustrates a flowchart of an enhanced inter-layer reference picture decoding method using an operation of inserting inter-layer reference picture indicators into macroblocks.

FIG. 11 illustrates a flowchart of an enhanced inter-layer reference picture decoding method using an operation of inserting inter-layer reference picture indicators into macroblocks.

The receiving unit 910 receives a bitstream (S1100). The bitstream includes macroblock indicators, which are inserted into intrablocks in an input picture by an encoder. The macroblock indicators indicate lower spatial layer pictures including macroblocks corresponding to macroblocks in the input picture.

If a current macroblock extracted from the received bitstream is an intrablock, the adaptive referring unit 920 refers to an intrablock Bk in a lower spatial layer indicated by the macroblock indicator inserted into a header of the intrablock (S1120).

Next, the recovering unit 930 performs inter-layer texture prediction decoding based on the macroblocks in at least one of the lower spatial layer pictures referred by the adaptive referring unit 920 (S1130).

Figure 12:
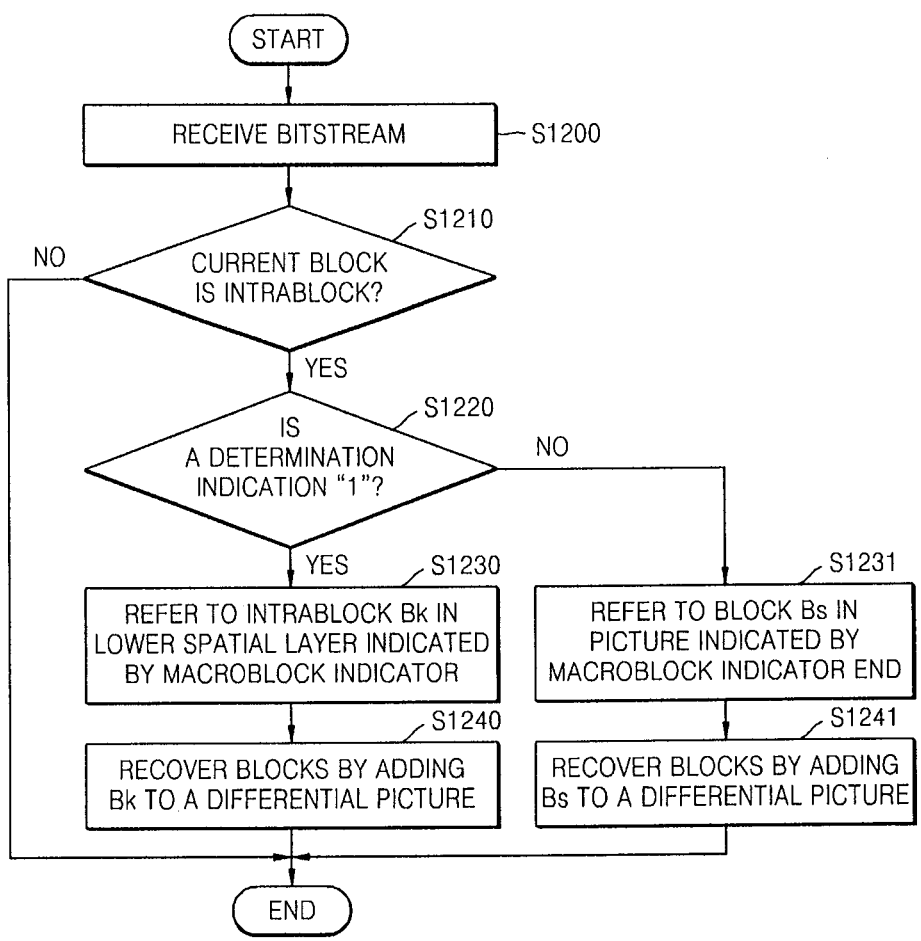
FIG. 12 illustrates a flowchart of an enhanced inter-layer reference picture decoding method using an operation of determining equality between a picture indicated by a current picture slice header and a picture indicated by a indicator inserted into a macroblock according to another embodiment of the present invention.

FIG. 12 illustrates a flowchart of an enhanced inter-layer reference picture decoding method using an operation of determining equality between a picture indicated by a current picture slice header and a picture indicated by a indicator inserted into a macroblock according to another embodiment of the present invention;

The receiving unit 910 receives a bitstream (S1200). The bitstream includes a slice indicator indicating a lower spatial layer picture slice to which macroblocks in an input picture slice refers most times, macroblock indicators indicating lower spatial layer pictures including macroblocks corresponding to the macroblocks in the input picture, and a determination indicator indicating equality between the layer spatial picture including the macroblocks indicated by the macroblock indicators and the lower spatial layer picture indicated by the slice indicator of the input picture.

In this case, the slice indicator is inserted into the slice header of the input picture, and the macroblock indicators and the determination indicator are inserted into headers of the intrablocks in the current input picture. In addition, the macroblock indicators are selectively inserted into the headers of the intrablocks according to the determination indicator.

If the current macroblocks extracted from the received bitstream are intrablocks, the adaptive referring unit 920 determines whether or not the determination indicator is "1" (S1220). The determination indicator of "1" denotes that the lower spatial layer picture indicated by the slice indicator is different from the lower spatial layer pictures indicated by the macroblock indicators. The determination indicator of "0" denotes that the lower spatial layer picture indicated by the slice indicator is equal to the lower spatial layer pictures indicated by the macroblock indicators. Since the construction associated with this case is substantially the same as or similar to those of FIGS. 4 and 5, detailed description thereof is omitted.

In case of the determination indicator of "1", blocks are recovered by referring to the intrablocks Bk in the lower spatial layer pictures indicated by the macroblock indicators and performing inter-layer texture prediction decoding (S1230 and S1240). In case of the determination indicator of "0", blocks are recovered by referring to blocks Bs in the lower spatial layer pictures indicated by the slice indicators and performing the inter-layer texture prediction decoding (S1231 and S1241).

FIG. 13 illustrates a macroblock syntax used for scalable extension of FIG. 12 according to another embodiment of the present invention.

As described above with reference to FIG. 5, the to-be-referred picture varies with a value of the determination indicator, for example, multi_reference_flag. Since the associated construction is the same as that of FIG. 5, detailed description thereof is omitted.

FIG. 14 illustrates a flowchart of an enhanced inter-layer reference picture decoding method using an operation of automatically searching an inter-layer reference picture according to another embodiment of the present invention.

A receiving unit of an inter-layer reference picture decoder receives a bitstream (S1400). The bitstream includes a slice indicator indicating a reference lower spatial layer picture slice used for inter-layer prediction of an input picture slice.

If a current block is an intrablock, it is determined whether or not an intrablock corresponding to the current to-be-encoded block exists in a lower layer picture indicated by the slice indicator (S1410 and S1420).

If the corresponding intrablock is determined not to exist, in an automatic intrablock retrieving operation, further lower spatial layers are hierarchically retrieved to search for lower spatial layers picture including the corresponding intrablock (S1430).

The corresponding intrablock Bc in the searched lower spatial layer picture is added to a differential picture, so that the block can be recovered (S1431 and S1432).

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

INDUSTRIAL APPLICABILITY

According to the present invention, it is possible to increase coding efficiency by allowing different blocks in an upper spatial layer picture of a current to-be-decoded or to-be-encoded picture to refer to blocks in different lower spatial layer pictures.

The invention claimed is:

1. An enhanced inter-layer reference picture designating apparatus comprising:
a computer system comprising a processor and a memory;
a macroblock searching unit which hierarchically retrieves at least two lower spatial layer pictures of an input picture and searches for macroblocks in the at least two lower spatial layer pictures that correspond to macroblocks in the input picture;
a macroblock indicator inserting unit operating on the computer system and adapted to insert, into the macroblocks in the input picture, macroblock indicators indicating the lower spatial layer pictures that correspond to macroblocks in the input picture; and
an adaptive referring unit operating on the computer system and adapted to refer to the macroblocks in the at least two lower spatial layer pictures indicated by the macroblock indicators,
wherein the macroblock indicators indicate the highest layer picture among the searched lower spatial layer pictures including the macroblocks corresponding to the macroblocks in the input picture.

2. The enhanced inter-layer reference picture designating apparatus of claim 1, further comprising a recovering unit which recovers blocks by performing inter-layer texture prediction decoding based on the macroblocks in the at least two lower spatial layer pictures.

3. The enhanced inter-layer reference picture designating apparatus of claim 1, wherein the macroblock is an intrablock.

4. The enhanced inter-layer reference picture designating apparatus of claim 1, wherein a spatiality or a quality of the lower spatial layer picture is less than that of the input picture.

5. An enhanced inter-layer reference picture decoder comprising:
a computer system comprising a processor and a memory;
a receiving unit operating on the computer system and adapted to receive a bitstream including macroblock indicators indicating at least two lower spatial layer pictures including macroblocks corresponding to macroblocks in an input picture;
an adaptive referring unit operating on the computer system and adapted to refer to the macroblocks in at least one of the lower spatial layer pictures indicated by the macroblock indicators; and
a recovering unit operating on the computer system and adapted to recover blocks by performing inter-layer texture prediction decoding based on the macroblocks in the at least one of the lower spatial layer pictures, and
wherein the at least two of the lower spatial layer pictures of the input picture are hierarchically searched, and
wherein the macroblock indicators indicate the highest layer picture among the searched lower spatial layer pictures including the macroblocks corresponding to the macroblocks in the input picture.

6. The enhanced inter-layer reference picture decoder of claim 5, wherein the macroblock indicators are inserted into macroblock headers in the input picture.

7. The enhanced inter-layer reference picture decoder of claim 5, wherein the macroblock of the at least two lower spatial layer pictures is an intrablock.

8. The enhanced inter-layer reference picture decoder of claim 5, wherein a spatiality or a quality of the lower spatial layer picture is less than that of the input picture.

9. An enhanced inter-layer reference picture designating method comprising:
hierarchically retrieving at least two lower spatial layer pictures of an input picture and searching for macroblocks in the lower spatial layer pictures corresponding to macroblocks in the input picture;
inserting in the macroblocks of the input picture, macroblock indicators indicating the lower spatial layer pictures having the corresponding macroblocks; and
referring to the macroblocks in the at least two lower spatial layer pictures indicated by the macroblock indicators, wherein the macroblock indicator indicates the highest layer picture among the lower spatial layer pictures including the macroblocks corresponding to the macroblocks in the input picture.

10. The enhanced inter-layer reference picture designating method of claim 9, recovering blocks by performing inter-layer texture prediction based on the macroblocks in the at least two lower spatial layer pictures referred in the referring of the macroblocks.

11. The enhanced inter-layer reference picture designating method of claim 9, wherein the macroblock is an intrablock.

12. The enhanced inter-layer reference picture designating method of claim 9, wherein a spatiality or a quality of the lower spatial layer picture is less than that of the input picture.

13. An enhanced inter-layer reference picture decoding method comprising:
- receiving a bitstream including macroblock indicators indicating a plurality of lower spatial layers including macroblocks corresponding to macroblocks in an input picture;
- adaptively referring to the macroblocks in at least two of the lower spatial layer pictures indicated by the macroblock indicators; and
- recovering blocks by performing inter-layer texture prediction decoding based on the macroblocks in at least two of the lower spatial layer pictures,
- wherein the macroblock indicators indicate the highest layer picture in the at least two of the lower spatial layer pictures including the macroblocks corresponding to the macroblocks in the input picture.

14. The enhanced inter-layer reference picture decoding method of claim 13, wherein the macroblock indicators are inserted into macroblock headers in the input picture.

15. The enhanced inter-layer reference picture decoding method of claim 13, wherein the macroblock is an intrablock.

16. The enhanced inter-layer reference picture decoding method of claim 13, wherein a spatiality or a quality of the lower spatial layer picture is less than that of the input picture.

17. A non-transitory computer-readable medium having embodied thereon a computer program for executing the methods of any one of claims 9 to 12, 13 to 14, and 15 to 16.

* * * * *